(No Model.) 3 Sheets—Sheet 1.

W. ACKERMAN & A. A. HASSELQUIST.
WHEELED SCRAPER.

No. 509,278. Patented Nov. 21, 1893.

WITNESSES:
C. Neveux
C. Sedgwick

INVENTORS
W. Ackerman
BY A. A. Hasselquist
Munn & Co
ATTORNEYS.

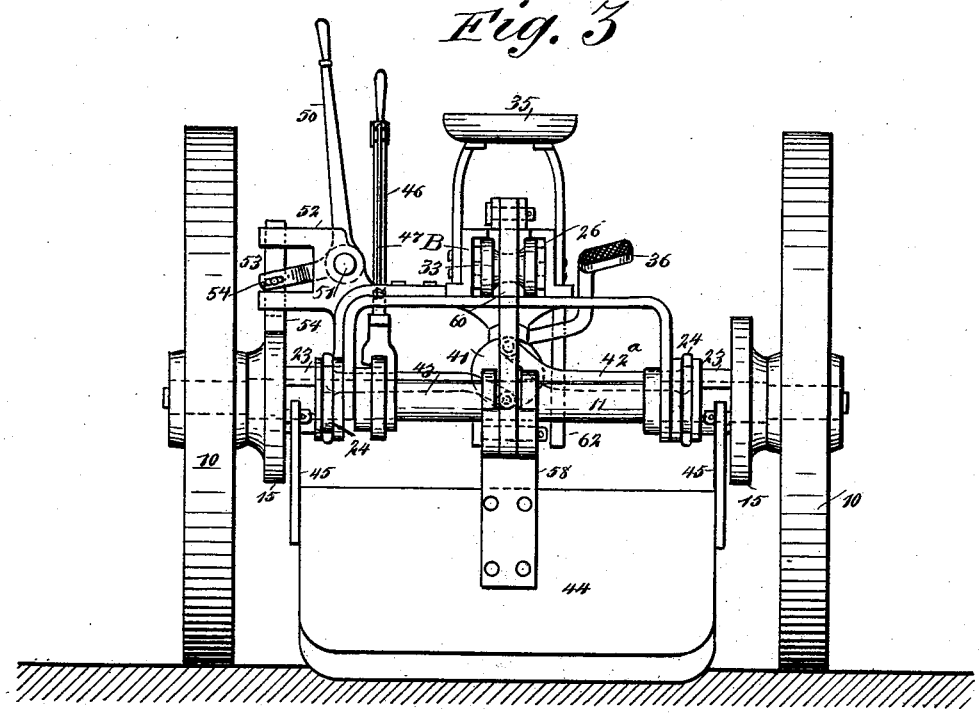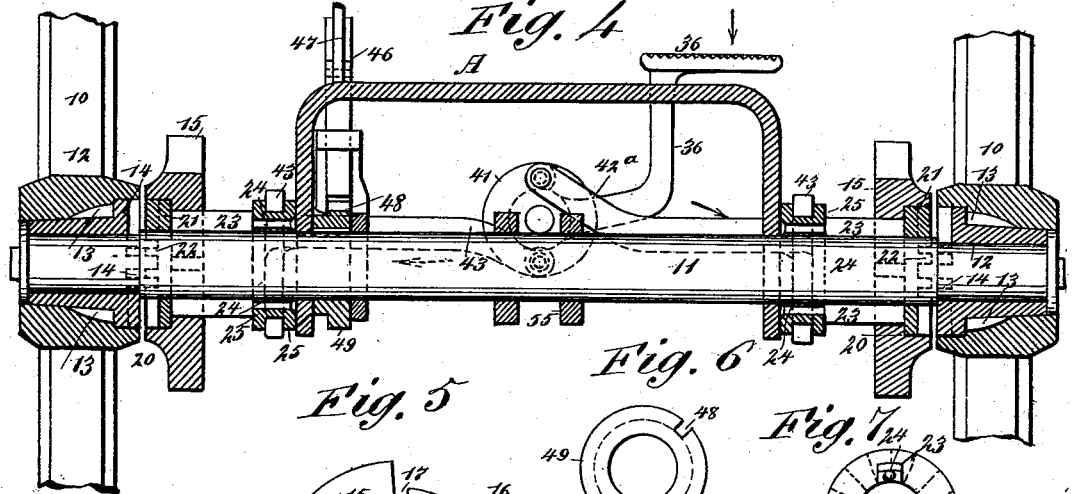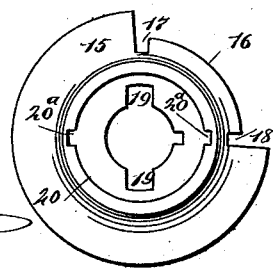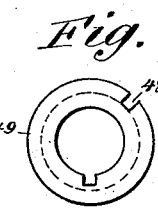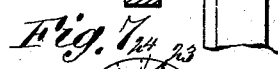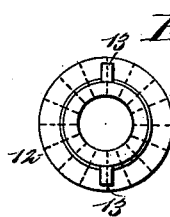

(No Model.) 3 Sheets—Sheet 3.
W. ACKERMAN & A. A. HASSELQUIST.
WHEELED SCRAPER.
No. 509,278. Patented Nov. 21, 1893.
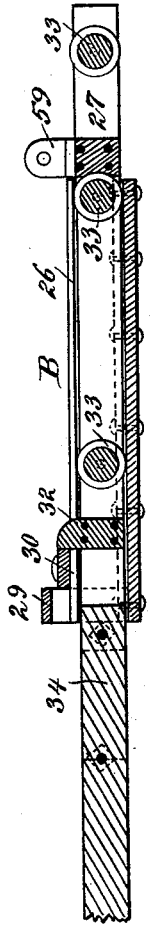
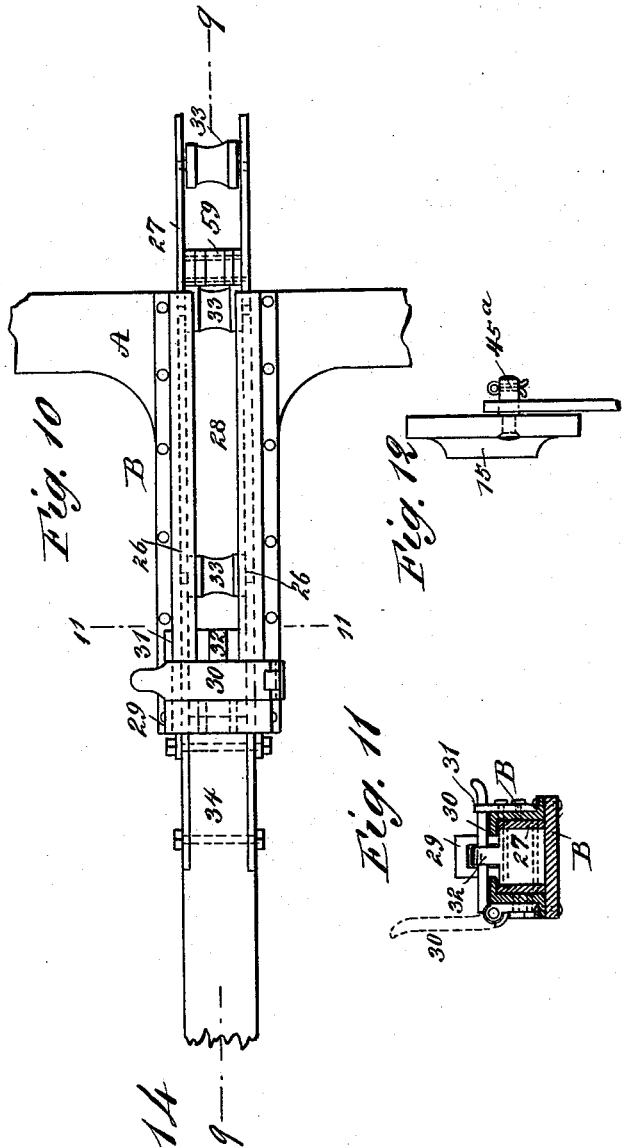
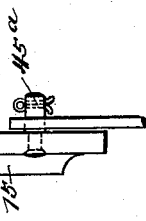
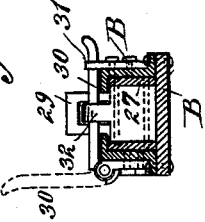
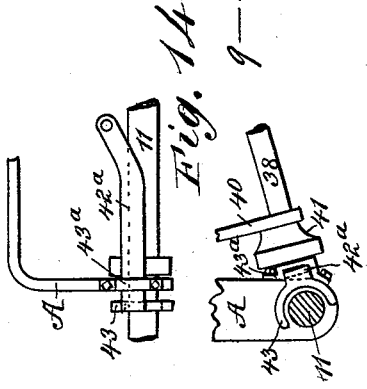
WITNESSES:
C. Neveux
C. Sedgwick
INVENTORS
W. Ackerman
A. A. Hasselquist
BY Munn & Co
ATTORNEYS.

UNITED STATES PATENT OFFICE.

WILLIAM ACKERMAN AND ALBERT A. HASSELQUIST, OF ELGIN, ILLINOIS.

WHEELED SCRAPER.

SPECIFICATION forming part of Letters Patent No. 509,278, dated November 21, 1893.

Application filed February 18, 1893. Serial No. 462,808. (No model.)

*To all whom it may concern:*

Be it known that we, WILLIAM ACKERMAN and ALBERT A. HASSELQUIST, of Elgin, in the county of Kane and State of Illinois, have invented a new and useful Improvement in Wheeled Scrapers, of which the following is a full, clear, and exact description.

Our invention relates to an improvement in wheeled scrapers, and it has for its object to provide a machine which carries a scoop, the machine being usually adapted for scraping roads, or for like work, and the prime object of the invention is to provide a scraper in which the scoop will be entirely under the control of one man, the manipulator being also capable of driving the team attached to the machine, and to so assemble the parts of the machine that the driver or manipulator may conveniently handle the machine and operate it expeditiously.

It is another object of the invention to provide a wheeled scraper of exceedingly simple yet durable construction, and to so construct it that the scoop will be held positively in a position to engage with the surface over which the machine is traveling, or be carried up to a carrying position above the ground, and whereby also the scoop may be raised or lowered at the will of the operator, and dumped by the action of the team whenever the operator so desires.

The invention consists in the novel construction and combination of the several parts as will be hereinafter fully set forth and pointed out in the claims.

Reference is to be had to the accompanying drawings forming a part of this specification, in which similar figures and letters of reference indicate corresponding parts in all the views.

Figure 1:
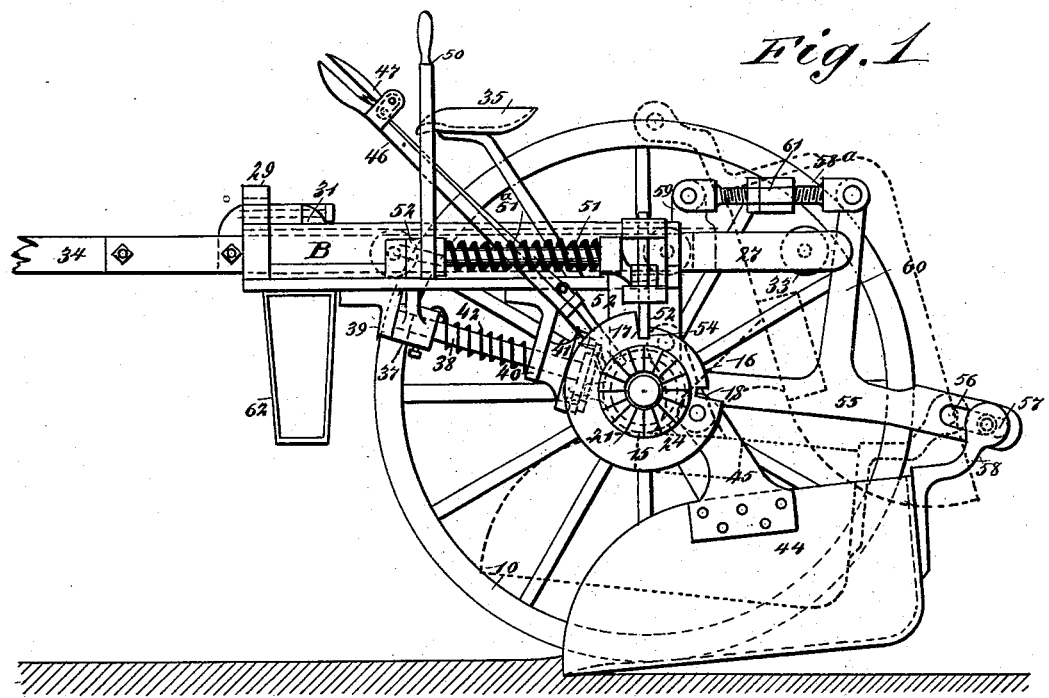
Figure 2:
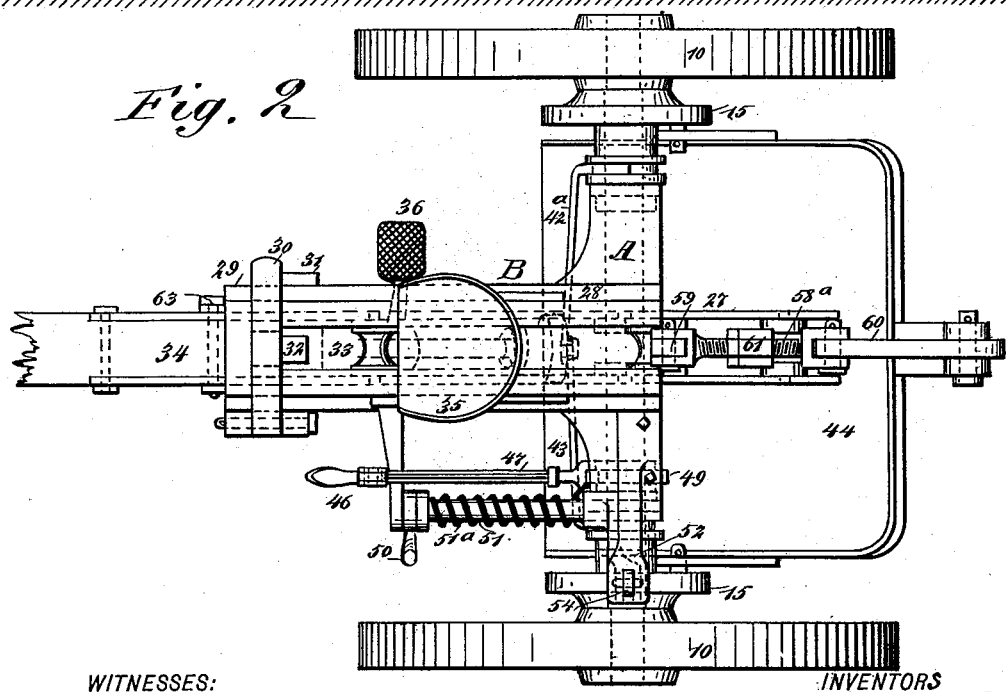

Figure 1 is a side elevation of the machine, one of the supporting wheels being removed. Fig. 2 is a plan view of the machine. Fig. 3 is a rear elevation thereof. Fig. 4 is a section taken vertically through the machine immediately over the axle; and Figs. 5, 6, 7 and 8, are detail views of various parts of the machine to be hereinafter described. Fig. 9 is a longitudinal section, taken practically on the line 9—9 of Fig. 10, through the draft pole and its sheath. Fig. 10 is a detail plan view of the draft pole sheath and a portion of the pole. Fig. 11 is a transverse section taken practically on the line 11—11 of Fig. 10. Fig. 12 is a side elevation of a locking disk, illustrating the manner in which the scraper is connected therewith; and Figs. 13 and 14 are detail views, illustrating guides for the clutch levers.

In carrying out the invention two supporting wheels 10, are loosely mounted upon an axle 11. The hub of each wheel is provided with an attached skein 12, the inner faces of the said skeins being toothed as shown in Fig. 8, which figure is a view of the hub and skein looking upon the outer face thereof, the skein being held within the hub by means of suitable keys 13, preferably made integral with the skein; and the inner face of the skein is much wider than the outer face, teeth 14 being formed upon the said inner surface, as best shown in Fig. 4. It will be understood that the skeins turn loosely with the wheels upon the axle.

In front of each skein 12, what may be termed a locking disk 15, is keyed or otherwise secured upon the axle. These disks are provided with a recess 16 in the periphery, the recess being given a predetermined length, and at the end walls of the recesses pockets are formed, which pockets are designated respectively as 17 and 18, one of the disks and its pockets being shown in detail in Fig. 5, and at opposite sides of the opening in each disk through which the axle passes, recesses 19, are formed, as is likewise best shown in Fig. 5.

In the central portion of the outer face of each locking disk, or that portion containing the recesses 19, a circular depression 20, is produced, and within this circular depression a clutch 21, is introduced, shown best in Figs. 4 and 7, the toothed face 22 of the clutch being adapted for interlocking engagement with the toothed face of the skein to which it is opposed. Each clutch 21, is provided with arms 23, attached to its inner face. These arms are concaved upon their lower or inner surfaces and convexed on their upper or outer surfaces, and the arms pass through the recesses 19 in the locking disks, the arms also fitting the contour of the axle along which they longitudinally extend.

In order that undue strain shall not be brought to bear upon the arms 23, lugs 22ª are formed upon opposite portions of the clutch periphery, which lugs are adapted to enter recesses 20ª in the margin of the circular depression 20 of the locking disk.

The arms 23, are secured by screws or bolts 24, or their equivalents, to sleeves 25, loosely mounted upon the axle, whereby, as the sleeves are carried in direction of the outer ends of the axle, or in direction of the center thereof, the clutches 21, are made to engage with the supporting wheels, or are carried out of engagement therewith, so that the axle will either turn with the supporting wheels or will remain inactive while the wheels revolve. This action is owing to the fact that the locking disks are keyed upon the axle, and the arms 23 of the clutches are prevented from turning in the disks, thus insuring one revolving with the other, or vice versa.

The frame of the machine comprises a rear yoke section A, and this yoke section is loosely mounted upon the axle, as shown in Fig. 4, the mounting occurring adjacent to the inner faces of the sleeves 25; and in addition to the yoke A, the frame comprises a horizontal and longitudinal extension B of the yoke, located over the central portion of the machine. The extension B, is hollow, and its inner surface is so constructed as to form slide-ways 26, as shown in Figs. 2, 3, 9, 10 and 11, for the reception of a slide 27. In the upper surface of the extension B of the frame a longitudinal slot 28, is made, extending from the rear to a point near the front of said extension, the front portion of the extension being closed by a strap or yoke-like bar 29; and adjacent to this bar 29 a latch 30, is hinged upon one side of the extension of the frame, and said latch normally extends over the top of the extension and engages at the opposite side with a keeper 31, as shown in Figs. 1, 2 and 11; and normally the slide 27, contained within the frame is prevented from moving by reason of a stop 32, formed upon the slide, engaging with the latch 30. The latch is readily thrown from over the extension of the frame and out of engagement with the stop through the medium of the foot of the driver of the machine. The yoke bar 29, which is virtually a stop bar, is of such height that the stop 32, may pass beneath it when the latch 30, is carried out of the path of the stop. In order that the slide may operate freely and with but little friction in its slide-way, said slide is provided with a series of friction rollers 33, which engage with the slide-way and with the top surface of the yoke or body section of the frame, as shown in Figs. 2, 3, 9, and 11; and the tongue or pole 34, is rigidly secured to the forward end of the slide.

The driver's seat 35, is mounted upon the extension B, of the main frame of the machine, the seat being so located that the driver may readily operate the latch 30 with one of his feet; and a foot lever 36, preferably of angular construction, is located at one side of the extension of the frame, the said foot lever to be pressed downward by the driver preferably with the right foot. The foot lever 36, is provided at its lower end with a sleeve 37, as shown in Fig. 1, and through the medium of this sleeve the foot lever is securely fastened to a shaft 38, the shaft being journaled near its ends in brackets 39 and 40, projected downward from the under face of the extension of the frame. At the rear end of the shaft 38 a head 41, is secured, and a spring 42, is made to encircle the shaft 38, one end of the spring being secured to the sleeve of the foot lever and the opposite end to the bracket 40. Thus when the foot lever is pressed downward the shaft is turned in a manner to coil the spring 42, and the head 41 is rotated. The foot lever is utilized for throwing the clutches in and out of gear with the driving or supporting wheels; and this action is brought about by pivoting upon the rear face of the head 41 the inner ends of two levers 42ª and 43 which move in guides 43ª, located upon the yoke section A of the frame, as shown in Figs. 13 and 14; the levers being pivoted upon the head diametrically opposite to each other, and the levers are carried to an engagement with the sleeves 25 of the clutch mechanism. Thus, as will be observed by reference to Fig. 4, when the foot lever is pressed downward and the head 41 is rotated, the levers 42ª and 43 will be forced in opposite directions, and will cause the sleeves 25 to slide outward upon the axle 11 and their clutch faces 21 to engage with the clutch surfaces of the wheel skeins.

The locking disks 15, are adapted primarily for locking purposes and secondly as supports for the scoop or scraper 44, the said scoop or scraper being provided at its sides with upwardly and forwardly extending arms 45, which arms are pivotally attached to the inner surfaces of the disks preferably through the medium of wrist pins 43ª secured to the latter, as shown in Fig. 12 and the position of the wrist pins is preferably near one end, or what may be termed the lower end of the recesses 16 in the disks, as is best shown in Fig. 1. When the axle 11, is revolved it will be understood that the disks are revolved also; and the axle may be turned at any time that may be desired through the medium of a hand lever 46, loosely mounted upon the axle, the said hand lever being provided with a hand latch 47, adapted to enter a notch or recess 48, produced in a collar 49, the said collar being splined or otherwise attached to the axle preferably near the left-hand member of the main portion of the main frame, as shown in Fig. 4, the said collar being shown in detail in Fig. 6.

The scoop or scraper is held in an elevated position, that is, out of engagement with the ground, or in a lower position to remove a layer from the surface, through the medium of a second lever 50. The lever 50, is located conveniently to the driver's seat 35, and the said lever is attached to one end of a horizontal shaft 51, which shaft is mounted in bearings 52, attached to the frame of the machine. The shaft 51, is encircled and controlled by a spring 51ª, and the rear end of the shaft, the lever being attached to the forward end, is provided with a crank arm 53, shown best in Fig. 3. This crank arm is pivotally connected with a bolt 54, said bolt having vertical movement in the rear bearing 52 of the shaft 51, the bolt being adapted to enter either of the depressions 17 or 18 in the recessed surface 16 of the left-hand disk 15. The right-hand disk is not provided with a recess 16, as no locking or lever connection is made with that disk, although such an attachment may be made if in practice it is found desirable.

The scoop or scraper is dumped by the manipulation of the slide 26; therefore the scoop or scraper is connected with the rear end of the slide. This connection is accomplished preferably in the following manner: An arm 55, is loosely mounted upon the center of the axle, and this arm extends rearwardly over the central portion of the scoop or scraper, said arm at its rear end being preferably given a slightly downward inclination. In the rear end of the arm 55 an elongated and horizontally located slot 56, is produced; and this slot receives a friction roller 57, which is pivoted upon a bracket 58, projected from the rear central portion of the scraper. The arm 55, is raised and lowered through the medium of an adjustable link 58ª, which link is pivotally connected with a post 59, extending upward from the slide 27 between the center and rear end thereof, the rear end of the link being pivotally connected with an upwardly-extending branch 60 of the arm 55, as is best shown in Fig. 1. The link 58ª is of peculiar construction, it being adjustable in order to regulate the depth that the scoop shall enter the ground; and to that end the link consists primarily of two screws, one being provided with a right-hand and the other with a left-hand thread, which screws are connected by an adjusting nut 61. Thus it will be observed that the distance between the post 59 and the branch 60 of the arm 55 may be increased or decreased as desired; and stirrups 62, may be placed beneath the forward end of the frame to accommodate the feet of the driver.

The operation of the machine is as follows: Taking it for granted that the scoop is in an upper position, in which event the locking bolt 54, will be in the lower pocket 18 of the left-hand disk 15, and it is desired to drop the scoop to scrape a road, for example, this is accomplished by drawing the lever 50, inward, thereby carrying the locking bolt 54 out of engagement with the disk pocket 18; and the scoop, by reason of its weight, will drop to the ground, it having been held only in its elevated position by the said locking bolt. After the scoop has dropped to the ground and as the horses are driven forward, the lever 46, is pulled, its latch entering the recess 48 in the axle collar 49, and through the medium of the said lever 46 the axle is turned a sufficient distance to cause the locking bolt 54 to enter the upper pocket 17 of the left-hand locking disk, as shown in Fig. 1, thus locking the scoop in its lower position. After the scoop is filled the lever 50, is again manipulated to withdraw the locking bolt from engagement with the left-hand locking disk, and at the same time the foot lever 36, is pressed and the axle thrown into gear with the supporting wheels. The rotation of the axle will revolve the disks 15, and thereby raise the scoop from the ground, and the scoop will be continued to be elevated until the locking bolt 54, enters the lower pocket 18 in the left-hand locking disk. When the place has been reached where the load is to be dumped the driver throws open the latch 30, ordinarily manipulating the latch with the right foot, and as the team advances the slide 27 is drawn forward in its slide-way and the rear end of the scoop is carried upward until the scoop reaches a vertical position, the scoop turning upon its pivotal connection with the locking disks; and at the moment that the scoop reaches its vertical position and the load is dumped, the post 59, carrying the link 58ª, will have engaged with the forward yoke 29 of the frame, and the advance movement of the slide will be checked. To again restore the scoop to its carrying position the team is backed, and when the lug 32 upon the slide has passed rearward of the forward yoke 29, the latch 30, is made to drop and engage with said lug, as shown in Fig. 2, and the slide is checked from going farther back by stops 63.

This device is exceedingly simple and readily operated; and it will be understood that the machine, after the load is dumped, may be driven back with the scoop in either one of the three positions above described.

Having thus described our invention, we claim as new and desire to secure by Letters Patent—

1. In a wheeled scraper, the combination, with an axle, and supporting wheels loosely mounted thereon, of a clutch connection between the axle and the supporting wheels, a scoop pivotally connected with the axle, a locking mechanism connected with the scoop, releasing devices connected with the locking mechanism, and a mechanism for raising and lowering the scoop, operated from the pole of the machine, substantially as described.

2. In a wheeled scraper, the combination, with an axle, supporting wheels loosely mounted thereon, and a clutch mechanism adapted to effect a union between the axle and the supporting wheels, of locking disks secured upon the axle, a scoop pivotally connected with the locking disk, and a locking lever in engagement with the locking disk, as and for the purpose set forth.

3. In a wheeled scraper, the combination, with an axle, supporting wheels loosely mounted upon the axle, a clutch mechanism adapted to effect a union between the axle and supporting wheels, and a lever operating the clutch mechanism, of locking disks secured upon the axle and provided with pockets, a scoop pivotally connected with the locking disks, a locking bolt adapted to enter the pockets in the locking disks, and a shifting lever connected with the axle, as and for the purpose set forth.

4. In a wheeled scraper, the combination, with a scoop, a slide and a pole connected with the slide, of a lever connection between the slide and the scoop, and a mechanism, substantially as shown and described, for controlling the throw of the scoop, as and for the purpose set forth.

5. In a wheeled scraper, the combination, with a supporting frame and a scoop pivotally connected with the frame, of a slide having movement in the frame, a lever connected with the scoop, and an adjustable link connection between the lever and the slide, substantially as shown and described.

6. In a road scraper, the combination, with an axle, a scoop pivotally connected with the axle, a lever fulcrumed upon the axle, and a bracket connected with the scoop and having movement in the lever, the lever being adapted to carry the bracket, of a slide, a pole and a connection between the pole and the slide, and a take-up mechanism between the slide and the lever, as and for the purpose set forth.

7. In a wheeled scraper, the combination, with an axle, a scoop pivotally connected with the axle, a lever fulcrumed at one end upon a fixed support, and a connection between the lever and the rear of the scoop, of a frame supported upon the axle, a slide having movement in the frame and connected at one end with the pole, a stop located upon the slide, and a latch carried by the frame and adapted for engagement with the stop, and a link connecting the slide and the lever, the link being made in adjustable sections, as and for the purpose specified.

8. In a wheeled scraper, the combination, with an axle, supporting wheels loosely mounted upon the axle, a clutch mechanism carried by the axle and adapted for engagement with the wheel, one lever operating the clutch mechanism, disks attached to the axle and adapted to turn therewith, one of the disks being provided with pockets, and a scoop pivotally connected with the disks, of a locking bolt entering the pockets in one of the disks, a lever actuating the bolt, a slide supported above the axle and connected with a pole at one end, a latch adapted to hold the slide in a rearward position, a lever fulcrumed upon a fixed support at one end and having connection at its opposite end with the scoop, and a link connection, substantially as shown and described, between the lever and the slide, as and for the purpose set forth.

WILLIAM ACKERMAN.
ALBERT A. HASSELQUIST.

Witnesses:
CLARENCE A. LAWSON,
L. D. JOSLYN.